Nov. 5, 1963  J. Z. NICOLAISEN  3,109,639
RESILIENT SUPPORTS

Filed Nov. 29, 1962  2 Sheets-Sheet 1

INVENTOR
JUNCKER Z. NICOLAISEN

BY
ATTORNEYS

Nov. 5, 1963  J. Z. NICOLAISEN  3,109,639
RESILIENT SUPPORTS
Filed Nov. 29, 1962  2 Sheets-Sheet 2

INVENTOR
JUNCKER Z. NICOLAISEN
BY
Holcombe, Wetherill & Brisbois
ATTORNEYS

United States Patent Office 3,109,639
Patented Nov. 5, 1963

3,109,639
RESILIENT SUPPORTS
Juncker Zelo Nicolaisen, Crawley, England, assignor to Silentbloc Limited, Sussex, England, a company of Great Britain
Filed Nov. 29, 1962, Ser. No. 241,014
Claims priority, application Great Britain Nov. 29, 1961
11 Claims. (Cl. 267—1)

This invention relates to resilient supports, which term is to be understood to include devices which may be arranged to connect two members or parts to one another in a manner tending to maintain them in and restore them to a predetermined relative position while permitting relative movement between them under the action of vibratory forces, shock loads or other variations in the force or forces tending to move the parts relatively to one another irrespective of whether the load or loads normally applied to the supports are partly or wholly gravitational or otherwise.

The invention is concerned with resilient supports of the general kind comprising a resilient element formed of rubber or other flexible resilient material including parts which are arranged to permit the required relative movement, between the members connected by the support under variations in load in at least one direction, by bending, one known form of such a support comprising a ring of rubber arranged to be secured at diametrically opposite circumferential points respectively to the two parts which it connects.

The invention is particularly, but not exclusively, applicable to resilient supports of the kind in question intended to support manufactured products in containers or supporting structures for transport and/or storage purposes, where it is desirable or necessary, for example in view of regulations or otherwise, that the supports shall permit some predetermined degree of relative movement between the container or other supporting structure in one or more directions under predetermined shock loads, applied for example by dropping the container or structure (or one end of it), and its contents, from a predetermined height and/or causing it to slide into contact with a rigid wall constituting a stop.

Thus, it is an object of the invention to provide a resilient support of the kind referred to in which under a predetermined normal load, e.g. that applied by reason of the dead weight of a product being supported, will maintain the product relatively firmly approximately in a predetermined position but will nevertheless have appropriate characteristics to allow for a substantial movement (with energy storage and dissipation) under heavy shock loads in one or more directions. It is nevertheless to be understood that resilient supports according to the invention may be used wherever a product is to be resiliently supported or wherever two parts are to be connected by a "support" or "supports" in a manner permitting, while resisting, relative movement between the parts with variations in a force or forces tending to cause such relative movement.

A resilient support according to the present invention comprises a resilient element formed of rubber or other flexible resilient material and having at least two substantially straight strut-like parts inclined at a substantial angle to one another with their adjacent ends connected to one another and arranged to be secured to one of the two parts to be connected by the support, and further parts (herein called inwardly extending parts) extending from the more widely spaced ends of the strut-like parts towards one another, making angles with the strut-like parts of less than 90°, and arranged to be secured at a point or points remote from their outer ends to the other of the two parts to be connected by the resilient support and so as to lie and be maintained in engagement with a supporting surface when the strut-like parts are in compression, whereas the outer end portions of the inwardly extending parts are free to lift from such supporting surface under the action of tension in the strut-like parts.

Preferably the strut-like parts are formed integral with one another, either directly or through the medium of a small connecting section, and integral with the inwardly extending parts. Moreover, the inwardly extending parts are conveniently formed integral with one another, that is to say are joined at their inner ends.

Two forms of resilient support according to the invention are shown by way of example in the accompanying drawings, in which.

Figure 1:
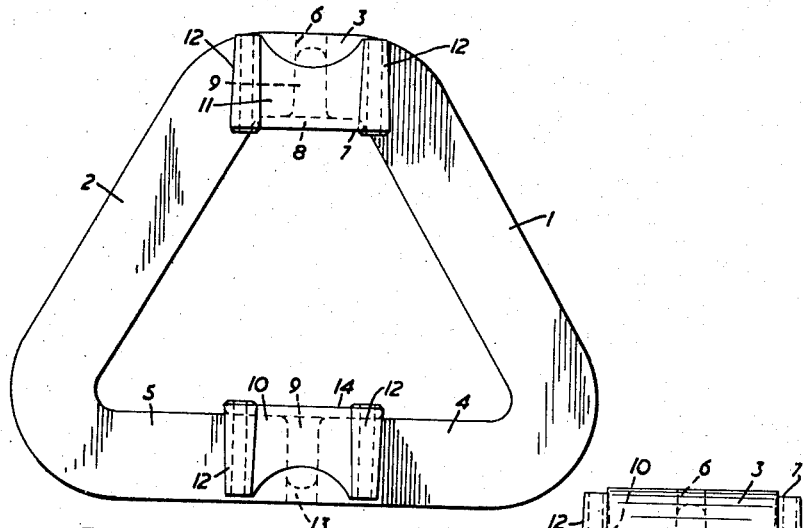
FIGURE 1 is a side elevation of one form of support according to the invention.
Figure 3:
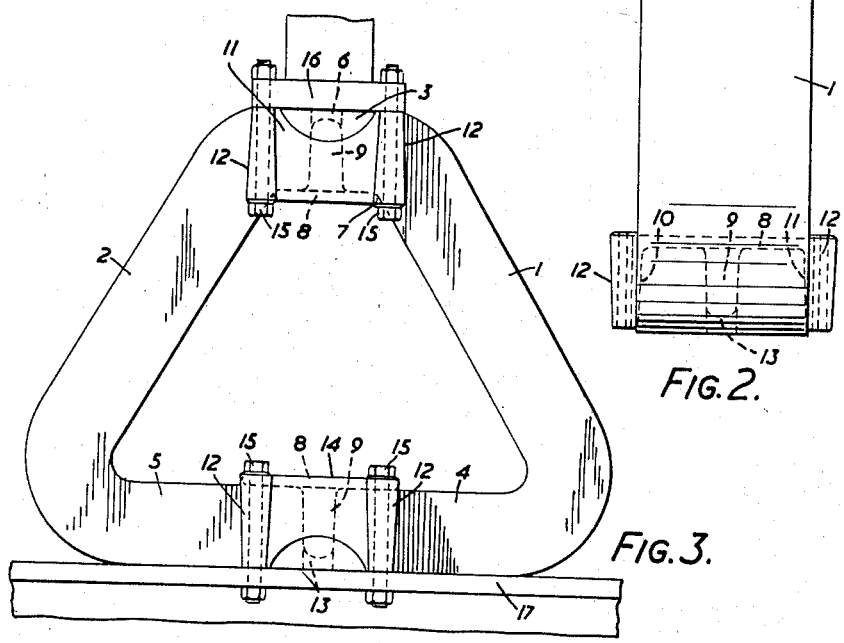
Figures 4, 5:
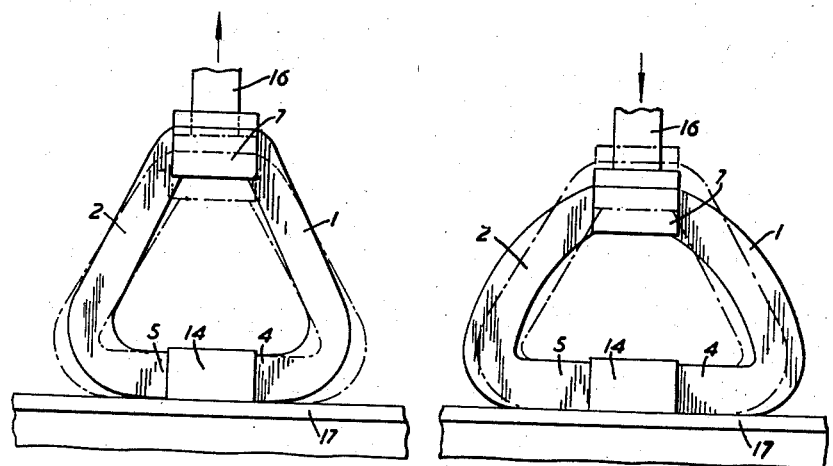
Figure 6:
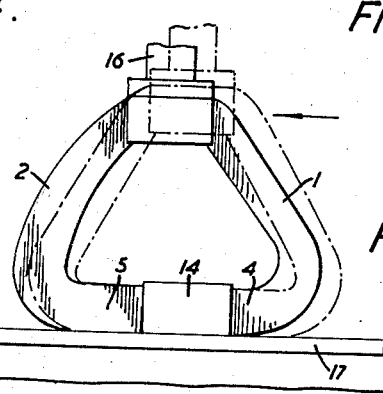
Figure 7:
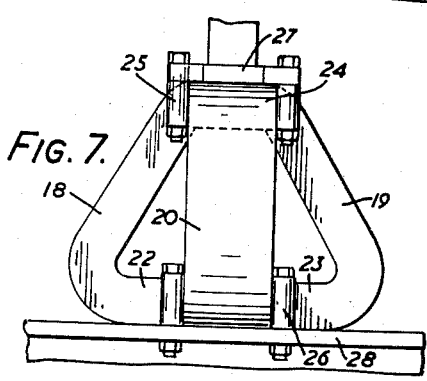
Figure 8:
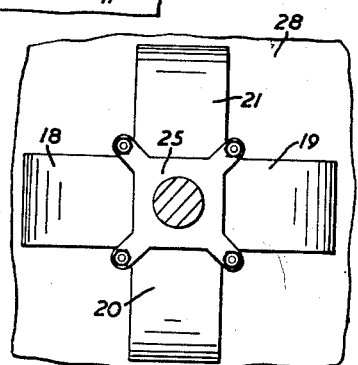

FIGURE 3 is a side elevation showing the support shown in FIGURE 1 attached to a base and to a part to be supported and having the form it will have (assuming it to be of dimensions suited to the load to be carried) under conditions of steady load (herein called static load), FIGURES 4, 5 and 6 are similar views to FIGURE 3 on a reduced scale (and with some parts omitted for simplicity) showing the types of flexing of the support which occur when the supported load applies to the support temporarily respectively a substantial upward force, a downward load substantially in excess of the static load, and a substantial lateral load in the direction of the arrow in FIGURE 6, FIGURE 7 is a similar view to FIGURE 3 on a reduced scale of a second form of support according to the invention attached to a base and to a part to be supported, and FIGURE 8 is a plan view of the support shown in FIGURE 7.

Figure 2:
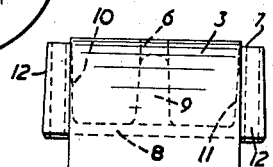
FIGURE 2 is an end elevation of the support shown in FIGURE 1.

In the constructions shown in FIGURES 1 and 2, the resilient support comprises a resilient element in the form of a unitary body of rubber of generally triangular shape consisting of two strut-like parts, 1 and 2, forming two sides of the triangle and joined at the apex by a part 3, and two inwardly extending parts, 4 and 5, which are integral with one another and together form the base of the triangle.

The part 3 is provided with a vertical aperture 6 and has associated with it a metal clamping member 7 including a transverse plate 8 provided with a pin 9 which extends into the aperture 6, and two side plates, 10 and 11, formed integral with the plate 8 and provided with four tubular bosses 12 to receive clamping bolts in a manner hereinafter described.

The base 4, 5 of the triangle has an aperture 13 formed therein and has associated with it a clamping member 14 which is of similar form to the clamping member 7 and to the corresponding parts of which, therefore, the same reference numerals have been applied. The clamping member 14 is disposed with its transverse plate 8 uppermost so that its pin 9 projects downwardly into the aperture 13 while its side plates 10 and 11 and bosses 12 extend downwardly from the plate 8 as shown.

In use, as shown in FIGURE 3, the clamping members 7 and 14, are clamped by bolts 15 respectively to a bracket or the like 16 on the part to be supported and to a base or like support 17 having dimensions such that under static load the lower surfaces of the parts 4 and 5 lie in contact therewith as shown. The dimensions of the clamping members 7 and 14 are such that in the assembled state, as shown in FIGURE 3, the parts of the resilient element lying between the side plates 10 and 11 of each clamping member are slightly compressed both vertically and laterally.

The engagement of the pins 9 with the apertures 6 and 13 assists in preventing lateral movements of the clamping members 7 and 14 relatively to the parts of the resilient element which they engage.

As indicated above, the dimensions of the resilient element would be such in relation to the load to be carried, that under static load conditions this element will have approximately the form shown in FIGURE 3, that is to say the strut-like parts 1 and 2 will be straight and the parts 4 and 5 will lie in contact with the upper surface of the support 17 for a substantial distance from the clamping member 14.

When, however, under conditions of vibratory or shock load, a substantial upward force is momentarily applied to the resilient element by the member 16 so that substantial tension is applied to the strut-like parts 1 and 2, the outer end portions of the parts 3 and 4 are lifted somewhat from the upper surface of the support 17 as shown in FIGURE 4, in which, for comparison, the form of the resilient element when under static load is indicated in chain line.

When, on the other hand, under conditions of vibratory or shock load, a downward force substantially in excess of the static load is applied by the part 16, to the resilient element, the strut-like parts 1 and 2 bow outwards as shown in FIGURE 5, in which, again for comparison, the form of the resilient element when under static load is indicated in chain line. It will be understood that a substantial initial rise in load above the static load is required to initiate such outward bending or bowing of the normally-straight strut-like parts 1 and 2 but that, after such initial bending or bowing has been effected, further increases in load will more readily increase the degree of bending or bowing. Thus the support is capable of resisting a substantial static load with small or negligible distortion but provides a comparatively high degree of resilience when a downward shock load of sufficient intensity to cause initial bending or bowing of the strut-like parts is applied by the part 16.

When a substantial lateral load is applied to the resilient element, by the part 16 in the direction indicated by the arrow in FIGURE 6, the outer end portion of the part 4 tends to be lifted from the upper surface of the support 17 by tension in the strut-like part 1 while the strut-like part 2 tends to be bent or bowed outwards as shown. In this case also, however, the strut-like part 2 will tend to offer substantial resistance to such bending or bowing and hence to such lateral movement except when a lateral force in excess of that which will initiate such bending or bowing occurs. In FIGURE 6 the form of the resilient support when under static load is shown in chain line for comparison and it will be understood that a sufficient lateral load in the opposite direction to the arrow will cause lifting of the part 5 and bowing of the part 1.

In the alternative construction of resilient support shown in FIGURES 7 and 8 the support comprises a unitary resilient element consisting of two pairs of strut-like parts 18 and 19, and 20, 21 with associated inwardly extending parts, two of which are shown as 22 and 23 but the other two of which are not visible in the drawings, the central vertical plane through the strut-like parts 18 and 19 and the associated inwardly extending parts 22 and 23 being at right angles to the central vertical plane through the parts 20 and 21 and their associated inwardly directed parts. The upper ends of the strut-like parts 18, 19, 20, 21, are united by a common apex portion 24 while the inner ends of the four inwardly extending parts are integral with one another.

Clamping members 25 and 26 similar in function to the clamping members 7 and 14 but somewhat different in form to suit the form of the resilient element are provided respectively to clamp the apex of the resilient element to a part 27 to be supported and the inner ends of the inwardly extending parts to a support 28 in the manner shown. As indicated in FIGURE 8, the support 28 has an upper surface of such area that it will, under static load conditions, be engaged by substantial areas of the undersurfaces of all four of the inwardly extending parts of the resilient element.

It will be understood that the characteristics of resilient supports according to the invention can be varied widely, for example by varying the cross-section of the strut-like parts (which may be either the same or different for the two or more strut-like parts), and/or by varying the thickness and/or form of the parts at the junctions between the strut-like parts and the inwardly extending parts, and/or by varying the thickness and/or cross-section of the inwardly extending parts in relation to that of the strut-like parts and/or by varying the angles which the strut-like parts make with one another and/or with the inwardly extending parts, and/or by varying the length over which the outer end portions of the inwardly extending parts are free to lift from their supporting surface under the action of tension in the strut-like parts.

The shape of the supporting surface may also be varied to modify the characteristics of the resilient support.

For example the resistance offered by the resilient support to relative movement of the parts connected by it in a direction at right angles to the plane in which the triangular support lies may be increased by increasing the width of the strut-like parts and/or the inwardly extending parts as measured for example in a direction at right angles to such plane.

It will moreover be readily understood that a number of resilient supports according to the invention may, when used in combination, be arranged in various relative positions and with their strut-like supports offering principal resistance to movement in various directions according to requirements.

Moreover, although the resilient elements in the examples of the invention shown comprise respectively two and four strut-like parts it will be understood that the invention includes within its scope resilient supports in which the resilient element includes three, or more than three strut-like parts which extend from the point or area at which they are connected to one another (at which point they are arranged to be secured to one of the two parts to be connected by the resilient support).

Moreover it will be apparent that the deflection characteristics of a support according to the invention when subjected to forces in various directions can readily be varied widely independently of one another by appropriate dimensioning of the various parts. For example the stiffness of the strut-like parts in resisting compressive loads may be varied not only by varying the cross-sectional dimensions of the strut-like parts but by varying the angle which they make with the inwardly extending parts and/or the sharpness of the corners occurring where they are connected to the inwardly extending parts while the stiffness of the resilient element under loads applying tension to the strut-like parts may be varied by changing the cross-sectional dimensions of the inwardly extending parts and/or the length of these parts and/or the area of these parts engaged by the clamping means by which their inner ends are secured to the appropriate one of the two members to be connected by the support.

It will be understood that in supports according to the invention the resilient element may be secured to the parts between which it extends in various ways, for example by bonding or by one or more bolts passing through the appropriate parts of the element in any appropriate direction or directions.

What I claim as my invention and desire to secure by Letters Patent is:

1. A resilient support comprising a resilient element formed of rubber or other flexible resilient material and having at least two substantially straight strut-like parts inclined at a substantial angle to one another and with their adjacent ends connected to one another and arranged to be secured to one of the two parts to be connected by the support, and further inwardly extending parts extending from the more widely spaced ends of the strut like parts towards one another, making angles with the strut like parts of less than 90° and arranged to be secured at a point or points remote from their outer ends to the other of the two parts to be connected by the support and so as to lie and be maintained in engagement with a supporting surface when the strut like parts are in compression, whereas the outer end portions of the inwardly extending parts are free to lift from such supporting surface under the action of tension in the strut like parts.

2. A resilient support as claimed in claim 1 in which the strut like parts are formed integral with one another and with the inwardly extending parts.

3. A resilient support as claimed in claim 2 in which the inwardly extending parts are integrally connected.

4. A resilient support as claimed in claim 3, in which the resilient element is in the general form of a triangle two sides of which are united at their adjacent ends and constitute said strut like parts, while the base of the triangle constitutes the inwardly extending parts.

5. A resilient support as claimed in claim 4 in which the strut like parts are of approximately the same length as one another.

6. A resilient support as claimed in claim 5 in which the resilient element is in the form of an approximately equilateral triangle.

7. A resilient support as claimed in claim 1 in which the resilient element is in the general form of a triangle two sides of which are united at their adjacent ends and constitute said strut like parts, while the base of the triangle constitutes the inwardly extending parts.

8. A resilient support as claimed in claim 7 in which the strut like parts are formed integral with one another and the inwardly extending parts.

9. A resilient support as claimed in claim 8 in which the inwardly extending parts are integrally connected.

10. A resilient support as claimed in claim 1 in which the resilient element comprises at least three of said strut like parts which extend from the point at which their adjacent ends are connected in directions inclined to and on the same side of a plane passing through such point or area of connection, while the inwardly extending parts extend substantially in a common plane from the outer ends of the strut like parts towards one another to the point at which they are arranged to be secured to the other of the two parts to be connected by the support.

11. A resilient support as claimed in claim 10 in which the strut like parts are formed integral with one another and with the integrally connected inwardly extending parts.

References Cited in the file of this patent

UNITED STATES PATENTS

| | | |
|---|---|---|
| 2,760,747 | Mordarski | Aug. 28, 1956 |
| 3,008,702 | Breneman | Nov. 14, 1961 |

FOREIGN PATENTS

| | | |
|---|---|---|
| 591,730 | Great Britain | Aug. 27, 1947 |
| 658,898 | Great Britain | Oct. 17, 1951 |